(12) United States Patent
Tae et al.

(10) Patent No.: US 12,172,708 B2
(45) Date of Patent: Dec. 24, 2024

(54) STEERING ASSIST DEVICE AND METHOD, AND STEERING SYSTEM

(71) Applicant: HL MANDO CORPORATION, Pyeongtaek-si (KR)

(72) Inventors: Hyun Chul Tae, Gyeonggi-do (KR); Joo Namgung, Gangwon-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 775 days.

(21) Appl. No.: 17/396,562

(22) Filed: Aug. 6, 2021

(65) Prior Publication Data

US 2022/0048560 A1 Feb. 17, 2022

(30) Foreign Application Priority Data

Aug. 11, 2020 (KR) .......................... 10-2020-0100715

(51) Int. Cl.
*B62D 5/04* (2006.01)
*B62D 15/02* (2006.01)

(52) U.S. Cl.
CPC ......... *B62D 5/049* (2013.01); *B62D 15/0225* (2013.01); *B62D 15/0235* (2013.01); *B62D 5/0424* (2013.01)

(58) Field of Classification Search
CPC ............................ B62D 5/049; B62D 15/0225; B62D 15/0235; B62D 5/0424; B62D 5/0481
See application file for complete search history.

(56) References Cited

U.S. PATENT DOCUMENTS

| | | | | |
|---|---|---|---|---|
| 11,046,359 | B2 * | 6/2021 | Shin ...................... | B62D 5/046 |
| 11,332,185 | B2 * | 5/2022 | Jeong ................... | B62D 5/0481 |
| 11,465,682 | B2 * | 10/2022 | Walentowski ......... | B62D 1/184 |
| 2018/0215409 | A1 * | 8/2018 | Pramod ............. | B62D 15/0235 |
| 2019/0092377 | A1 * | 3/2019 | Shin ...................... | B62D 5/0481 |
| 2019/0100237 | A1 * | 4/2019 | Klesing ................ | B62D 5/0493 |
| 2019/0135336 | A1 * | 5/2019 | Jeong ................... | B62D 5/0475 |
| 2020/0231209 | A1 * | 7/2020 | Walentowski .......... | G01L 5/221 |

* cited by examiner

*Primary Examiner* — Kevin Hurley
*Assistant Examiner* — Michael R Stabley
(74) *Attorney, Agent, or Firm* — Womble Bond Dickinson (US) LLP

(57) ABSTRACT

Embodiments of the disclosure relate to a steering assist device and method, and a steering system. The steering assist device comprises an input-side steering control module controlling an input-side steering actuator to assist an input-side mechanism connected with a steering wheel and an output-side steering control module controlling an output-side steering actuator to assist an output-side mechanism mechanically separated from the input-side mechanism and connected with a wheel. The output-side steering control module may control an output-side steering motor based on a position sensing value of the output-side mechanism and a position sensing value of an output-side steering motor included in the output-side steering actuator, which are received from their respective sensors.

17 Claims, 14 Drawing Sheets

STEERING ASSIST DEVICE AND METHOD, AND STEERING SYSTEM

CROSS-REFERENCE TO RELATED APPLICATION

This application claims priority from Korean Patent Application No. 10-2020-0100715, filed on Aug. 11, 2020, which is hereby incorporated by reference for all purposes as if fully set forth herein.

BACKGROUND

Field

Embodiments of the disclosure relate to a steering assist device and method, and a steering system.

Description of Related Art

In general, steering system refers to a system in which the driver of a vehicle may change the steering angle of the wheels of a vehicle based on the steering force (or rotational force) applied to the steering wheel. Electromotive power steering systems, e.g., electric power steer (EPS), have been recently applied to vehicles to ensure stable steering by reducing the steering force of the steering wheel.

There is an increasing requirement for reliability and redundancy functionality in recent vehicle steering systems.

BRIEF SUMMARY

The embodiments may provide a steering assist device capable of enhancing the redundancy functionality and reliability.

Further, the embodiments may provide a steering system capable of enhancing the redundancy functionality and reliability.

Further, the embodiments may provide a steering assist method capable of enhancing the redundancy functionality and reliability.

According to an embodiment, there may be provided a steering assist device comprises an input-side steering control module controlling an input-side steering actuator to assist an input-side mechanism connected with a steering wheel, and an output-side steering control module controlling an output-side steering actuator to assist an output-side mechanism mechanically separated from the input-side mechanism and connected with a wheel, wherein output-side steering control module checks whether each of a position sensing value of the output-side mechanism and a position sensing value of an output-side steering motor included in the output-side steering actuator, received from respective sensors, is normal, compares a normal position sensing value of the output-side mechanism with a normal position sensing value of the output-side steering motor to thereby verify validity for the normal position sensing values, and controls the output-side steering motor based on a target position value of the output-side mechanism received from the input-side steering control module and one normal position sensing value of the normal position sensing value of the output-side mechanism and the normal position sensing value of the output-side steering motor verified for validity.

According to an embodiment, there may be provided a steering system comprises a steering device including an input-side mechanism connected with a steering wheel and an output-side mechanism mechanically separated from the input-side mechanism and connected with a wheel, and a steering assist device including an input-side steering control module controlling an input-side steering actuator to assist the input-side mechanism and an output-side steering control module controlling an output-side steering actuator to assist the output-side mechanism, wherein the output-side steering control module checks whether each of a position sensing value of the output-side mechanism and a position sensing value of an output-side steering motor included in the output-side steering actuator, received from respective sensors, is normal, compares a normal position sensing value of the output-side mechanism with a normal position sensing value of the output-side steering motor to thereby verify validity for the normal position sensing values, and controls the output-side steering motor based on a target position value of the output-side mechanism received from the input-side steering control module and one normal position sensing value of the normal position sensing value of the output-side mechanism and the normal position sensing value of the output-side steering motor verified for validity.

According to an embodiment, there may be provided a steering assist method performed by an output-side steering control module controlling an output-side steering actuator including an output-side steering motor to assist an output-side mechanism mechanically separated from an input-side mechanism connected with a steering wheel and connected with a wheel, the steering assist method comprising receiving a target position value of the output-side mechanism, receiving a position sensing value of the output-side mechanism and a position sensing value of the output-side steering motor included in the output-side steering actuator from respective sensors, and checking whether each of the position sensing value of the output-side mechanism and the position sensing value of the output-side steering motor is normal, comparing a normal position sensing value of the output-side mechanism with a normal position sensing value of the output-side steering motor to thereby verify validity for the normal position sensing values, and controlling the output-side steering motor based on the target position value of the output-side mechanism and one normal position sensing value of the normal position sensing value of the output-side mechanism and the normal position sensing value of the output-side steering motor verified for validity.

According to the embodiments, it is possible to provide a steering assist device capable of enhancing the redundancy functionality and reliability.

According to the embodiments, it is possible to provide a steering system capable of enhancing the redundancy functionality and reliability.

According to the embodiments, it is possible to provide a steering assist method capable of enhancing the redundancy functionality and reliability.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
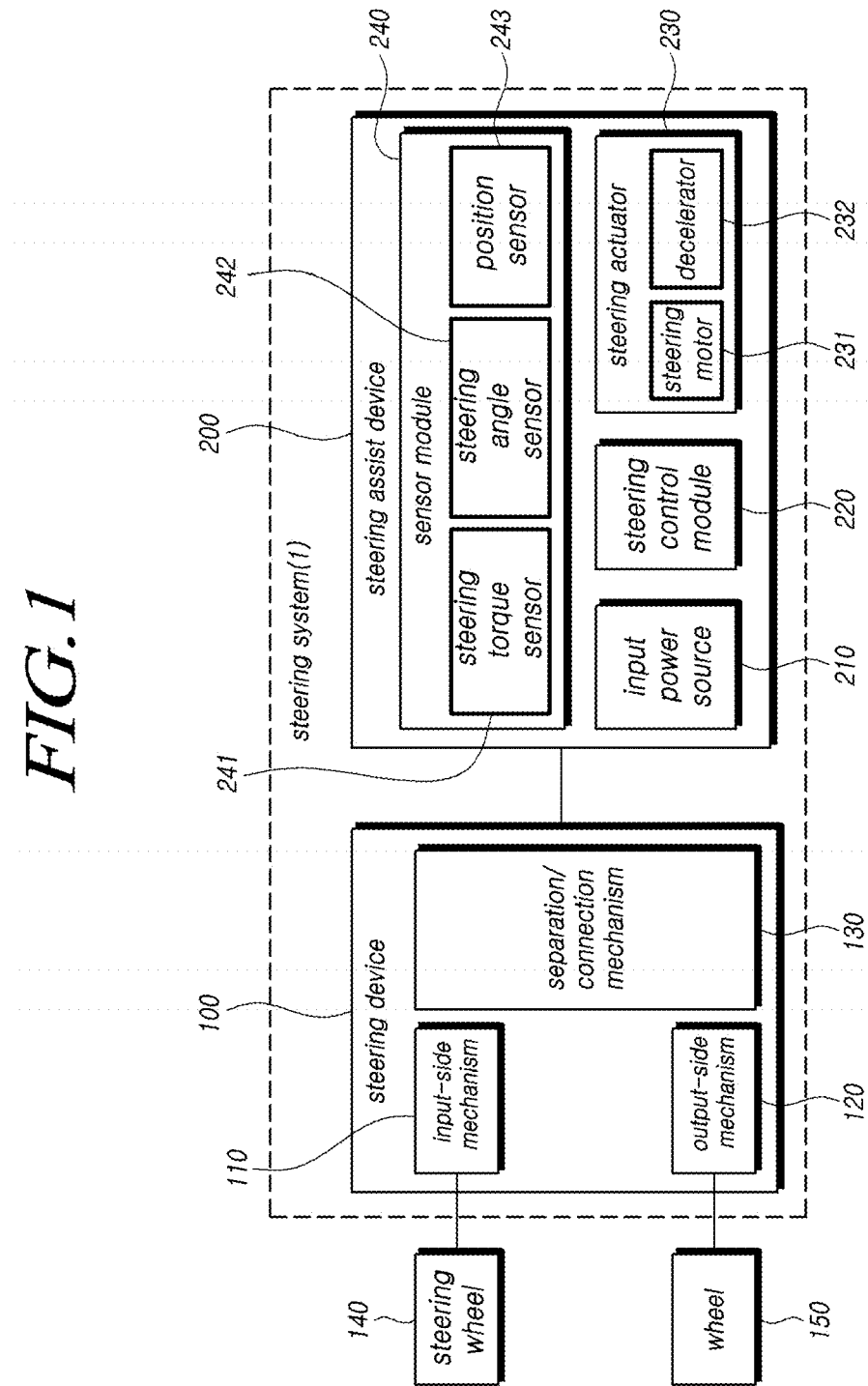
FIG. 1 is a block diagram illustrating a configuration of a steering system according to an embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a configuration of a steering system according to an embodiment.

Referring to FIG. 1, according to an embodiment, a steering system 1 may include at least one of a steering device 100 or a steering assist device 200. The steering device 100 and the steering assist device 200 may be connected by at least one of an electrical, magnetic, or mechanical connection. The steering device 100 may change the steering angle of a wheel 150 based on a steering force (or rotational force) applied to the steering wheel 140. The steering device 100 may include at least one of an input-side mechanism 110, an output-side mechanism 120, or a separation/connection mechanism 130.

There may be provided one or more input-side mechanisms 110. The input-side mechanism 110 may be connected to the steering wheel 140. The input-side mechanism 110 may rotate in a rotational direction of the steering wheel 140 or in a direction opposite to the rotational direction of the steering wheel 140. The input-side mechanism 110 may include a steering shaft connected to the steering wheel 140 but, without limitations thereto, may include any mechanism (or device) that may rotate in the rotational direction of the steering wheel or in the direction opposite to the rotational direction of the steering wheel.

There may be provided one or more output-side mechanisms 120. The output-side device 120 may be connected to the input-side device 110 by at least one of an electrical or mechanical connection. The output-side mechanism 120 may be connected to the wheel 150, changing the steering angle (or movement) of the wheel 150. The output-side mechanism 120 may include at least one of a pinion, a rack, a tie rod, or a knuckle arm but, without limitations thereto, may include any mechanism (or device) that may change the steering angle (or movement) of the wheel.

There may be provided one or more separation/connection mechanisms 130. The separation/connection mechanism 130 may be connected to the input-side mechanism 110 and the output-side mechanism 120. The separation/connection mechanism 130 may mechanically and/or electrically connect and/or separate the input-side device 110 and the output-side device 120. The separation/connection mechanism 130 may include a clutch but, without limitations thereto, may include any mechanism (or device) that may connect and/or separate the input-side mechanism and the output-side mechanism.

According to an embodiment, the steering device 100 may include at least one of a steering device in which an input-side mechanism and an output-side mechanism are connected mechanically, a steering device (or steer by wire (SbW)) in which an input-side mechanism and an output-side mechanism are connected electrically, or a steering device (or an SbW including a clutch) in which an input-side mechanism and an output-side mechanism are connected with a separation/connection mechanism.

There may be provided one or more steering wheels 140 or one or more wheels 150. The steering wheel 140 and the wheel 150 may be separately provided as illustrated in the drawings but, without limitations thereto, may be included in the steering device 100.

The steering assist device 200 may be connected with the steering device 100. The steering assist device 200 may provide an assist steering force to the steering device 100.

According to an embodiment, the steering assist device 200 may include at least one of an input power source 210, a steering control module 220, a steering actuator 230, or a sensor module 240.

There may be provided one or more input power sources 210. The input power source 210 may include at least one of a direct current (DC) power source or an alternating current (AC) power source. In particular, the DC power source may include a battery but, without limitations thereto, may include any power source may provide DC power.

The sensor module 240 may include at least one sensor. Here, the sensor may include at least one of a steering torque sensor 241, a steering angle sensor 242, or a position sensor 243 but, without limitations thereto, may include any sensor capable of measuring the state of the vehicle and the steering state of the vehicle.

There may be provided one or more steering torque sensors 241. The steering torque sensor 241 may measure the steering torque of the steering wheel to obtain steering torque information for the steering wheel, and provide the torque information for the steering wheel to the steering control module 220. There may be provided one or more steering angle sensors 242. The steering angle sensor 242 may measure the steering angle of the steering wheel to obtain steering angle information for the steering wheel, and provide the steering angle information for the steering wheel to the steering control module 220. There may be provided one or more position sensors 243. The position sensor 243 may measure at least one of the position of the input-side mechanism, the position of the output-side mechanism, or the position of the steering motor to thereby obtain at least one of position information for the input-side mechanism, position information for the output-side mechanism, or a position information for the steering motor and may provide at least one of the position information for the input-side mechanism, the position information for the output-side mechanism, or the position information for the steering motor to the steering control module 220.

The steering torque sensor 241, the steering angle sensor 242, and the position sensor 243 may be included in the sensor module as illustrated in the drawings but, without limitations thereto, may be included in at least one of the input-side mechanism 110, the output-side mechanism 120, the separation/connection mechanism 130, the steering wheel 140, the wheel 150, the input power source 210, the steering control module 220, or the steering actuator 230 (steering motor 231 or decelerator 232).

There may be provided one or more steering control modules 220. The steering control module 220 may be connected to the input power source 210. The steering control module 220 may receive electrical energy from the input power source 210 and filter noise of the electrical energy.

The steering control module 220 may generate a steering motor control signal based on information (e.g., at least one of the steering torque information, steering angle information, position information, or vehicle speed information) received from each component in the steering system 1 and/or the vehicle.

The steering control module 220 may convert the filtered electrical energy according to the steering motor control signal to thereby generate an assist steering force and control the steering actuator 230 (or steering motor 231) based on the assist steering force.

There may be provided one or more steering actuators 230. The steering actuator 230 may be connected with the steering control module 220. The steering actuator 230 may operate based on the assist steering force provided from the steering control module 220, assisting the steering device 100 in steering.

The steering actuator 230 may include at least one of the steering motor 231 or a decelerator 232. There may be provided one or more steering motors 231 or one or more decelerators 232. At least one of the steering motor 231 or the decelerator 232 may be connected with the steering control module 220.

If the steering actuator 230 includes the steering motor 231, the steering motor 231 may operate based on the assist steering force provided from the steering control module 220, assisting the steering device 100 in steering.

If the steering actuator 230 includes the steering motor 231 and the decelerator 232, the steering motor 231 may operate based on the assist steering force provided from the steering control module 220, and the decelerator 232 may operate according to the operation of the steering motor 231 to thereby assisting the steering device 100 in steering.

The steering motor 231 may include at least one of a single winding-type steering motor or a dual winding-type steering motor but, without limitations thereto, may include any motor that may assist the steering device in steering.

The steering motor 231 may include at least one of a three-phase type motor, or a five-phase type motor but, without limitations thereto, may include any motor that may assist the steering device in steering.

The steering motor 231 may include at least one of a DC motor or an AC motor (e.g., a synchronous motor and/or an induction motor) but, without limitations thereto, may include any motor that may assist the steering device in steering.

Figure 2:
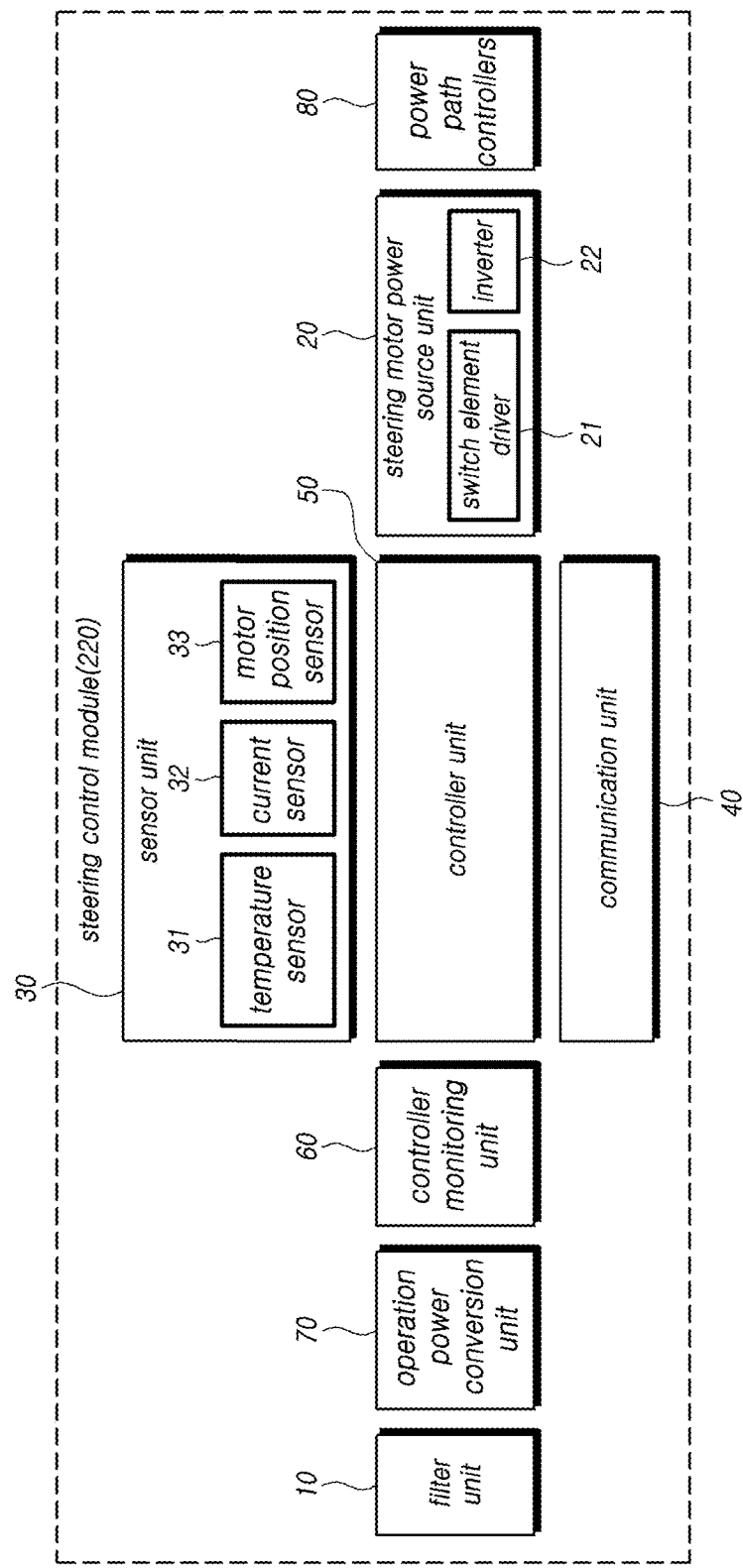
FIG. 2 is a block diagram illustrating a configuration of a steering control module according to an embodiment.

FIG. 2 is a block diagram illustrating a configuration of a steering control module according to an embodiment.

Referring to FIG. 2, according to an embodiment, the steering control module 220 may include at least one of a filter unit 10, a steering motor power source unit 20, a sensor unit 30, a communication unit 40, a controller unit 50, a controller monitoring unit 60, an operation power conversion unit 70, or a power path controller 80.

There may be provided one or more filter units 10. The filter unit 10 may be connected to the input power source. The filter unit 10 may filter noise of electric energy provided from the input power source and provide the filtered electric energy to the steering motor power source unit 20 and the operation power conversion unit 70.

There may be provided one or more steering motor power source units 20. The steering motor power source unit 20 may be connected with the filter unit 10 and may receive filtered electric energy from the filter unit 10. The steering motor power source unit 20 may be connected with the controller unit 50 and may receive a steering motor control signal from the controller unit 50. The steering motor power source unit 20 may generate an assist steering force by converting the filtered electric energy based on the steering motor control signal, and control the steering motor based on the assist steering force.

The steering motor power source unit 20 may include at least one of a switch element driver 21 or an inverter 22. There may be provided one or more switch element drivers 21 or one or more inverters 22.

The switch element driver 21 may receive the steering motor control signal from the controller unit 50, generate a switch element control signal based on the steering motor control signal, and provide the switch element control signal to the inverter 22. The inverter 22 may convert the filtered electrical energy of the filter unit according to the switch element control signal, generating an assist steering force.

The inverter 22 may include a switch and/or a transistor but, without limitations thereto, may include any element (or device) that may generate an assist steering force by converting the electrical energy according to the steering motor control signal and/or the switch element control signal.

If the inverter 22 includes a field effect transistor (FET), the switch element driver 21 may be a gate driver. Accordingly, the gate driver may receive the steering motor control signal from the controller unit 50, generate a gate control signal based on the steering motor control signal, and provide the gate control signal to the inverter 22. The inverter 22 may convert the filtered electrical energy of the filter unit according to the gate control signal, generating an assist steering force.

There may be provided one or more power path controllers 80. The power path controller 80 may be located between the steering motor power source unit 20 (or the inverter 22) and the steering actuator 230 (or the steering motor 231), supplying or cutting off the supply of the assist steering force received from the steering motor power source unit 20 (or the inverter) to the steering actuator 230 (or the steering motor 231).

The power path controller 80 may include at least one phase disconnector (PCO). The phase disconnector is an element or circuit capable of cutting off a phase, and may include at least one of a switch, a circuit breaker, a disconnecting switch, or a transistor but, without limitations thereto, may include any element and/or circuit that may cut off a phase.

The sensor unit 30 may include at least one of a temperature sensor 31, a current sensor 32, or a motor position sensor 33 but, without limitations thereto, may include any sensor that may measure the state of the steering system (or the steering control module). There may be provided one or more temperature sensors 31, one or more current sensors 32, or one or more motor position sensors 33.

The temperature sensor 31 may measure the temperature of the steering control module 220 to thereby obtain temperature information, and provide the temperature information to the controller unit 50. The current sensor 32 may measure the assist current (or assist steering force) provided from the steering motor power source unit 20 to the steering actuator 230 (or the steering motor 231) to thereby obtain assist current information, and provide the assist current information to the controller unit 350. The motor position sensor 33 may measure the position of the steering motor to obtain position information for the steering motor and may provide the position information for the steering motor to the controller unit 50. The motor position sensor 33 may be included in the steering control module 220 but, without being limited thereto, the motor position sensor 33 may be separately provided.

There may be provided one or more communication units 40. The communication unit 40 may include at least one of an internal communication unit or an external communication unit. When there are a plurality of steering control modules, the internal communication unit may be connected with other steering control modules to receive or provide information. The external communication unit may be connected with the vehicle to receive vehicle state information (e.g., vehicle speed information) from the vehicle or provide information related to the steering system to the vehicle.

There may be provided one or more controller units 50. The controller unit 50 may be connected with each component of the steering control module 220 to provide or receive information and, based thereupon, control the operation for each component of the steering control module 220.

For example, the controller unit 50 may generate a steering motor control signal based on at least one of the steering torque information for the steering wheel, steering angle information for the steering wheel, temperature information, assist current information, position information (position information for the input-side mechanism, position information for the output-side mechanism, and position information for the steering motor), vehicle state information (e.g., vehicle speed information), state information for the input power source, short circuit (or overcurrent) state information, current sensing information for the filter unit, or state information for the steering motor, and provide the steering motor control signal to the steering motor power source unit 20 (or switch element driver 21), or may generate a separation/connection control signal (e.g., a clutch control signal) and provide the separation/connection control signal to the separation/connection mechanism.

The controller unit 50 may include a microcontroller but, without limitations thereto, may include any device (or computer) that may process (or execute or compute) programs.

The controller monitoring unit 60 may be connected with the controller unit 50. The controller monitoring unit 60 may monitor the operating state of the controller unit 50. For example, the controller unit 50 may provide a watchdog signal to the controller monitoring unit 60. The controller monitoring unit 60 may be cleared based on the watchdog signal received from the controller unit 50 or may generate a reset signal and provide the reset signal to the controller unit 50.

The controller monitoring unit 60 may include a watchdog but, without limitations thereto, may include any device capable of monitoring the controller unit. In particular, a watchdog may include a window watchdog having a deadline, that is, a start and an end.

The operation power conversion unit 70 may be connected with the filter unit 10. The operation power conversion unit 70 may generate an operating voltage for each component of the steering control module 220 by converting the filtered electrical energy received from the filter unit 10. The operation power conversion unit 70 may include at least one of a DC-DC converter or a regulator but, without limitations thereto, may include any device that may convert the filtered electrical energy to thereby generate an operating voltage for each component of the steering control module and/or for the outside of the steering control module.

The steering control module 220 may include an electronic control unit (ECU) but, without limitations thereto, may include any controller (or system) that may perform electronic control.

In the following description, for simplicity of description, the steering device 100 is a steer by wire (SbW) steering device, and the steering control module 220 includes an input-side steering control module and an output-side steering control module. However, without limitations thereto, the following description may apply to any structure that may assist the steering device 100 via the steering control module 220.

Figure 3:
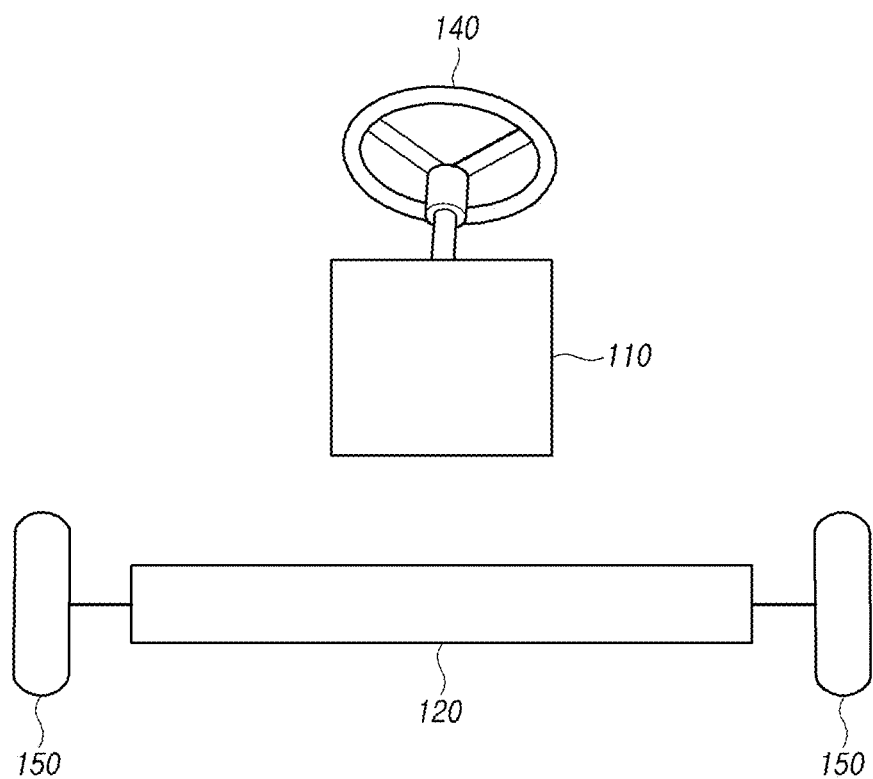
FIG. 3 is a view illustrating a steering device according to an embodiment.

FIG. 3 is a view illustrating a steering device according to an embodiment.

Referring to FIG. 3, according to an embodiment, a steering device 100 may include an input-side mechanism 110 connected with a steering wheel 140 and an output-side mechanism 120 mechanically separated from the input-side mechanism 110 and connected with a wheel 150. In other words, according to an embodiment, the steering device 100 may be a steer by wire (SbW) steering device.

The input-side mechanism 110 may rotate in a rotational direction of the steering wheel 140 or in a direction opposite to the rotational direction of the steering wheel 140, and may include, e.g., a steering shaft connected with the steering wheel 140. The output-side mechanism 120, which is mechanically separated from the input-side mechanism 110 and is electronically connected therewith, may be connected with the wheel 150, changing the steering angle (or movement) of the wheel. The input-side mechanism 110 may include at least one of a pinion, a rack, a tie rod, or a knuckle arm.

FIGS. 4 to 9 are views illustrating an output-side mechanism according to an embodiment.

Figure 4:
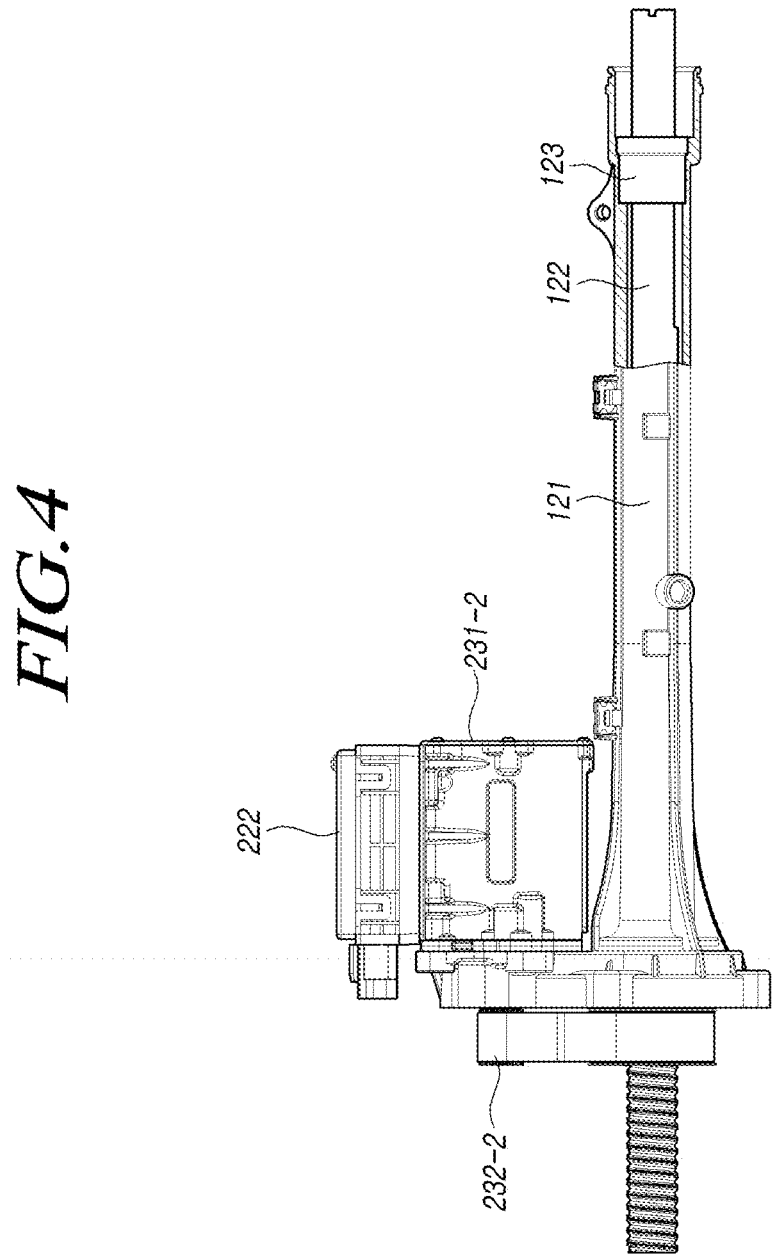
FIGS. 4, 5, 6, 7, 8, and 9 are views illustrating an output-side mechanism according to an embodiment.

Referring to FIG. 4, according to an embodiment, an output-side mechanism 120 may include at least one of a sliding bar 122 or an anti-rotation member 123.

The sliding bar 122 may be provided to be axially slidable in the housing 121. The anti-rotation member 123 may be hollow and may be circumferentially supported by the sliding bar 122 and be coupled to the inner circumferential surface of the housing 121.

The sliding bar 122 may be a mechanism (or a member) that functions as a rack, with the pinion, of the pinion and the rack, removed. Accordingly, the output-side mechanism may include a sliding bar 122 that functions as the rack, with the pinion removed.

An output-side steering actuator 230 (e.g., an output-side steering motor 231-2 or an output-side decelerator 232-2) may be connected with the sliding bar 122.

In other words, the output-side steering actuator 230 (e.g., the output-side steering motor 231-2 or the output-side decelerator 232-2) may be connected with the sliding bar 122. The rotational force of the output-side steering actuator 230 (e.g., the output-side steering motor 231-2 and/or the output-side decelerator 232-2) may be transferred to the sliding bar 122 to axially slide the sliding bar 122. A tie rod and a knuckle arm are coupled to the sliding bar 122, so that the wheels may be steered as the sliding bar 122 axially slides in the housing 121.

In this case, in order for the sliding bar 122 to be axially slid by the rotational force of the output-side steering actuator 230 (e.g., the output-side steering motor 231-2 and/or the output-side decelerator 232-2), the sliding bar 122 needs to be prevented from rotating around the central axis. Thus, the output-side mechanism according to an embodiment may include the anti-rotation member 123 that is hollow, is coupled to the inner circumferential surface of the housing 121, and is circumferentially supported by the sliding bar 122.

The conventional steer-by-wire steering device prevents rotation of the sliding bar by adopting the pinion shaft of the general steering device and engage it with the rack gear formed on the sliding bar, thereby providing high compatibility with the production line and assembly line for general steering devices. However, such a structure requires machining of a rack gear on the sliding bar and more parts, such as a support yoke, as well as a pinion shaft, resultantly increasing the number of parts and complicating the assembly process.

In other words, in contrast to the conventional steer-by-wire steering device which has a pinion shaft and a support yoke on the right side, the steer-by-wire steering device according to an embodiment prevents rotation of the sliding bar by using an anti-rotation preventing member, eliminating the need for machining a rack gear or providing a pinion shaft and a support yoke and hence saving parts. Further according to an embodiment, the anti-rotation member may be axially assembled, which may simplify the assembly process and significantly save costs.

Referring to FIGS. 5 to 8, the anti-rotation member 123 according to an embodiment may include a supporting member 123-2 coupled to the inner circumferential surface of the housing 121 and a bushing member 123-1 coupled to the supporting member 123-2 and circumferentially supported on the sliding bar 122.

The supporting member 123-2 is axially inserted into the housing 121. For example, the supporting member 123-2 is screwed to the housing 121 and supported by a noise damper or a snap ring, and may thereby be prevented from loosening.

A first flat portion 122-1 is formed on the outer circumferential surface of the sliding bar 122 and a second flat portion 123-11 supported on the first flat portion 122-1 is formed on the inner circumferential surface of the bushing member 123-1, so that the bushing member 123-1 may be circumferentially supported by the sliding bar 122, and the sliding bar 122 may thus axially slide without rotation.

The bushing member 123-1 is circumferentially fixed to the supporting member 123-2 or the housing 121, which is described below in connection with embodiments.

Figure 5:
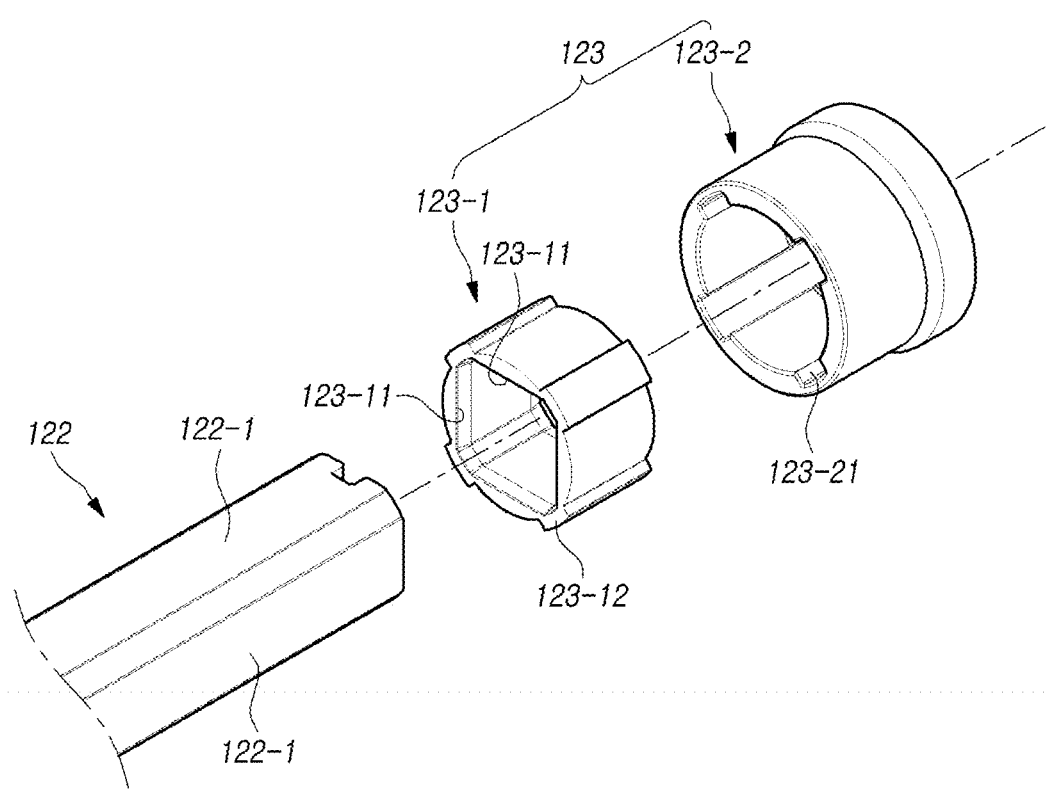

Referring to FIG. 5, insertion portions 123-12 may protrude from the outer circumferential surface of the bushing member 123-1, and insertion grooves 123-21, into which the insertion portions 123-12 are fitted into, may be formed in the inner circumferential surface of the supporting member 123-2.

Since the insertion portions 123-12 are fitted into the insertion grooves 123-21 and the bushing member 123-1 is circumferentially fixed, the first flat portion 122-1 and the second flat portion 123-11 are supported, preventing rotation of the sliding bar 122.

Figure 6:
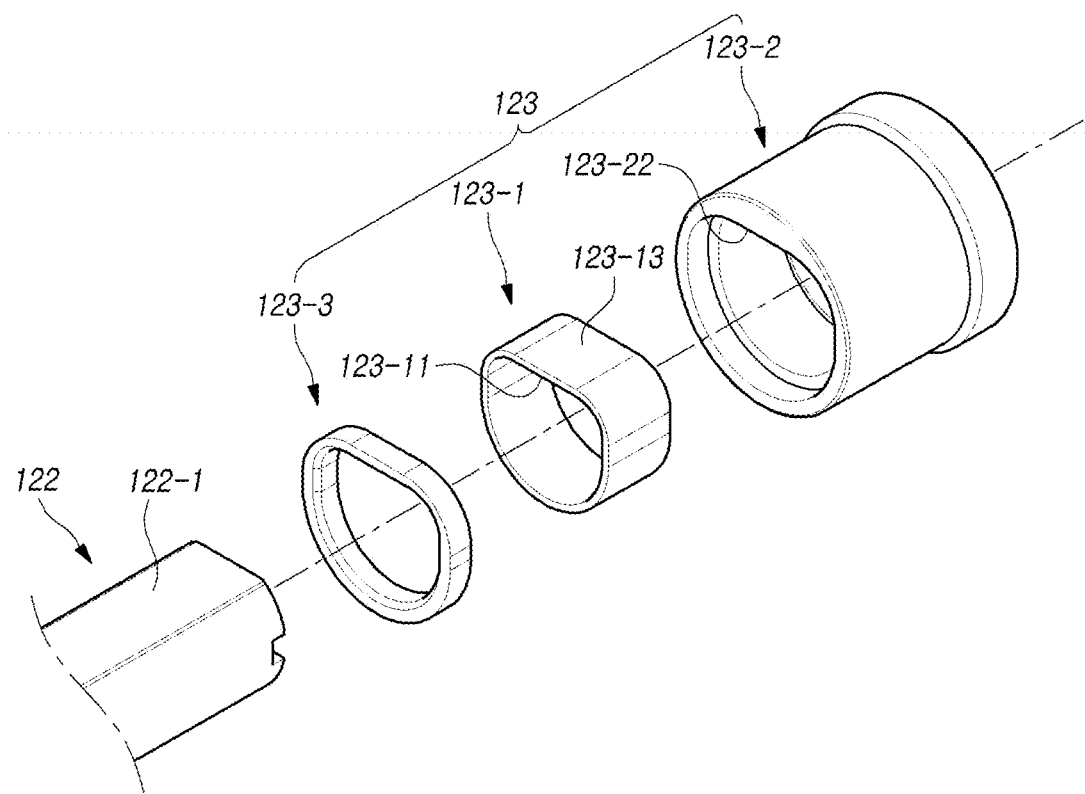

Referring to FIG. 6, a third flat portion 123-13 may be formed on the outer circumferential surface of the bushing member 123-1, and a fourth flat portion 123-22 supported by the third flat portion 123-13 may be formed on the inner peripheral surface of the supporting member 123-2.

In other words, like the first flat portion 122-1 and the second flat portion 123-11 are supported by each other and the sliding bar 122 is circumferentially supported by the bushing member 123-1, the third flat portion 123-13 and the fourth flat portion 123-22 are supported by each other, and the bushing member 123-1 is circumferentially supported by the supporting member 123-2.

The inner circumferential surface of the supporting member 123-2 may be stepped so that a first side of the bushing member 123-1 may be axially supported, and a coupling member 123-3 supported by a second side of the bushing member 123-1 may be coupled to the inner circumferential surface of the supporting member 123-2.

Figure 7:
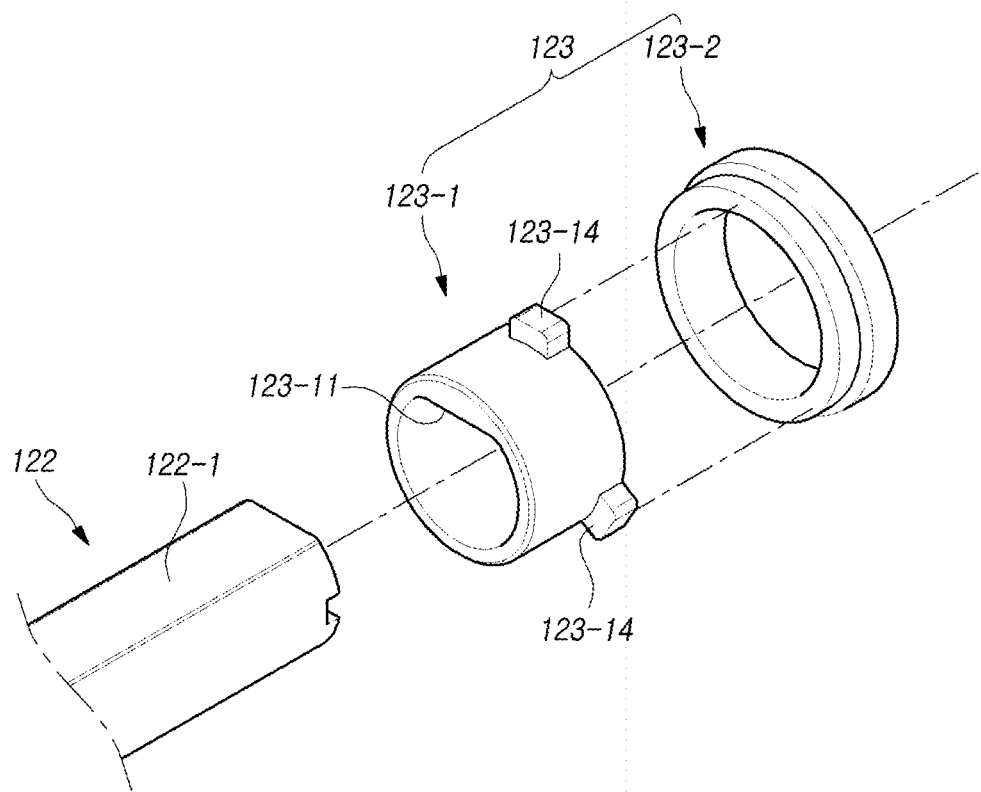

Referring to FIG. 7, protrusions 123-14 may be formed on the outer circumferential surface of the bushing member 123-1, and grooves into which the protrusions 123-14 are axially fitted may be formed in the housing 121, so that the bushing member 123-1 may be circumferentially fastened with respect to the housing 121.

Figure 8:
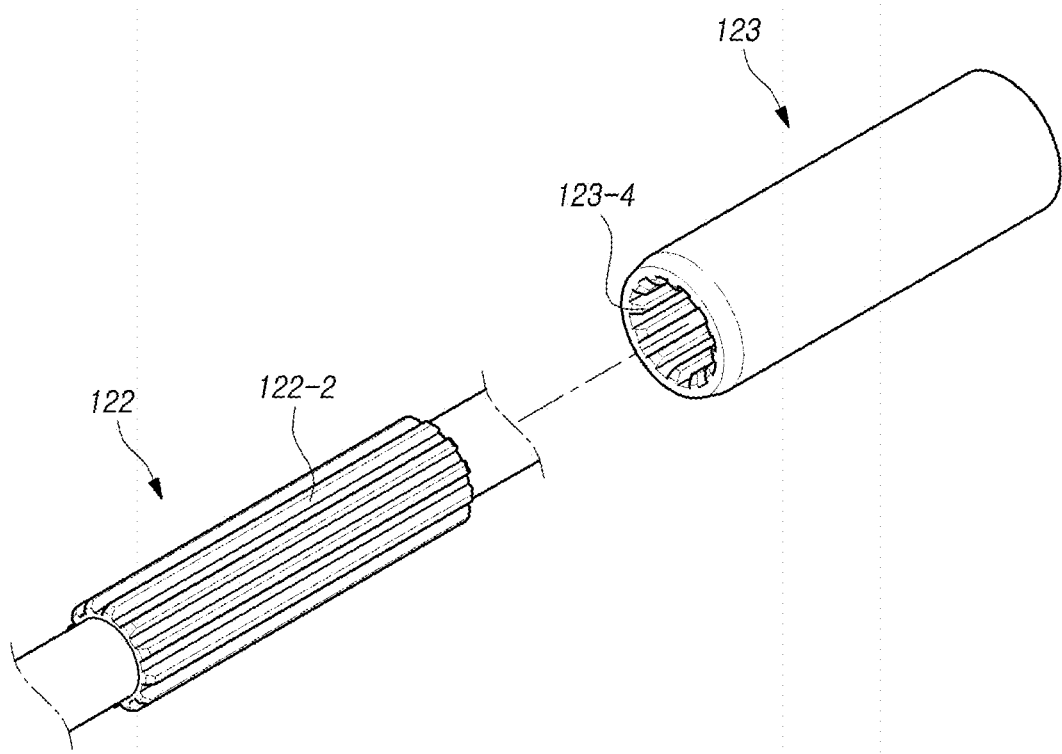

Referring to FIG. 8, the anti-rotation member 123 may be coupled to the sliding bar 122 by serrations, preventing rotation of the sliding bar 122.

In other words, a first serration 122-2 is formed on the outer circumferential surface of the sliding bar 122, and a second serration 123-4, which is engaged with the first serration 122-2, is formed on the inner peripheral surface of the anti-rotation member 123. The sliding bar 122 axially slides while being prevented from circumferentially rotating by the first serration 122-2 and the second serration 123-4.

Figure 9:
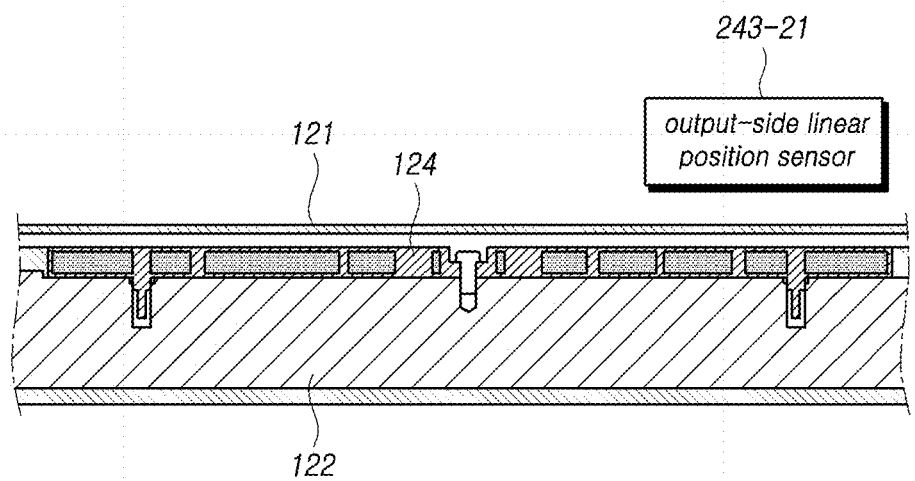

Referring to FIG. 9, a magnet 124 may be positioned on the sliding bar 122. Without being limited to one magnet, more magnets 124 may be provided.

An output-side linear position sensor 243-21 may be positioned on the housing 121. The output-side linear position sensor 243-21 may measure the position (or magnetic flux) of the magnet 124 to generate a position sensing value of the output-side mechanism 120 (or the sliding bar 122). The output-side linear position sensor 243-21 may be provided separately but, without limitations thereto, may be included in the steering control module 220.

Figure 10:
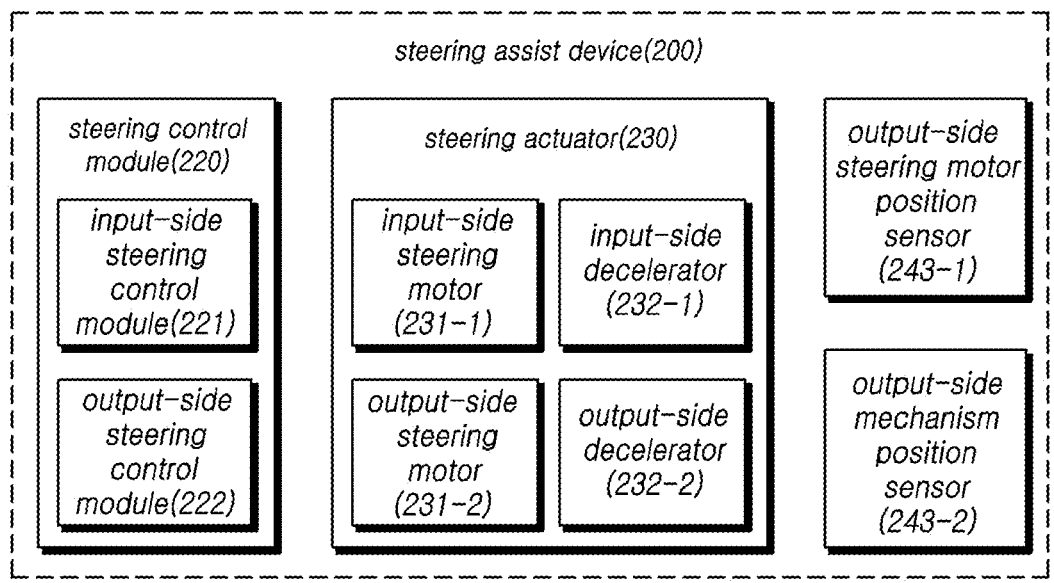
FIG. 10 is a block diagram illustrating a configuration of a steering assist device according to an embodiment.

FIG. 10 is a block diagram illustrating a configuration of a steering assist device according to an embodiment.

Referring to FIG. 10, a steering assist device according to an embodiment may include at least one of a steering control module 220, a steering actuator 230, an output-side steering motor position sensor 243-1, and an output-side mechanism position sensor 243-2.

There may be provided a plurality of steering control modules 220. The plurality of steering control modules may include at least one input-side steering control module 221 and at least one output-side steering control module 222.

There may be provided a plurality of steering actuators 230. The plurality of steering actuators 230 may include at least one input-side steering actuator and at least one output-side steering actuator.

In particular, the input-side steering actuator may include at least one of an input-side steering motor 231-1 or an input-side decelerator 232-1. There may be provided one or more input-side steering motors 231-1 or one or more input-side decelerators 232-1. The output-side steering actuator 230 may include at least one of an output-side steering motor 231-2 or an output-side decelerator 232-2. There may be provided one or more output-side steering motors 231-2 or one or more output-side decelerators 232-2.

There may be provided a plurality of output-side steering motor position sensors 243-1 or there may be provided a plurality of output-side mechanism position sensors 243-2. The output-side mechanism position sensor 243-2 may include, e.g., an output-side linear position sensor 243-21.

Referring to FIGS. 1 to 10, according to an embodiment, a steering system 1 may include at least one of a steering device 100 or a steering assist device 200.

According to an embodiment, a steering system 1 may include a steering device 100 including an input-side mechanism 110 connected with a steering wheel 140 and an output-side mechanism 120 connected with a wheel 150.

For example, according to an embodiment, a steering system 1 may include a steering device 100 that includes an input-side mechanism 110 connected with a steering wheel 140 and an output-side mechanism 120 mechanically separated from the input-side mechanism 110 and connected with a wheel 150.

According to an embodiment, a steering system 1 may include an input-side steering control module 221 controlling an input-side steering actuator 230 to assist an input-side mechanism 110 connected with a steering wheel 140 and an output-side steering control module 222 controlling an output-side steering actuator 230 to assist an output-side mechanism 120 connected with a wheel 150.

For example, according to an embodiment, a steering system 1 may include an input-side steering control module 221 controlling an input-side steering actuator 230 to assist an input-side mechanism 110 connected with a steering wheel 140 and an output-side steering control module 222 controlling an output-side steering actuator 230 to assist an output-side mechanism 120 mechanically separated from the input-side mechanism 110 and connected with a wheel 150.

The output-side steering control module 220 may check whether each of a position sensing value of the output-side mechanism and a position sensing value of an output-side steering motor included in the output-side steering actuator 230, received from respective sensors, is normal, compare a normal position sensing value of the output-side mechanism with a normal position sensing value of the output-side steering motor to thereby verify validity for the normal position sensing values, and control the output-side steering motor 231-2 based on a target position value of the output-side mechanism received from the input-side steering control module 221 and one normal position sensing value of the normal position sensing value of the output-side mechanism and the normal position sensing value of the output-side steering motor verified for validity.

According to an embodiment, the output-side steering control module 222 may select either the position sensing value of the output-side mechanism or the position sensing value of the output-side steering motor as a primary position sensing value and the other as a redundant position sensing value, check whether each of the primary position sensing value and the redundant position sensing value is normal, compare a normal primary position sensing value and a normal redundant position sensing value to thereby verify validity for the normal primary position sensing value, and control the output-side steering motor 231-2 based on the validity-verified normal primary position sensing value and the target position value of the output-side mechanism.

If the validity-verified normal primary position sensing value is changed to an abnormal value while controlling the output-side steering motor 231-2 based on the target position value of the output-side mechanism and the validity-verified normal primary position sensing value, the output-side steering control module 222 may control the output-side steering motor 231-2 based on the target position value of the output-side mechanism and the normal redundant position sensing value.

In another embodiment, the output-side steering control module 222 may check whether each of the position sensing value of the output-side mechanism and the position sensing value of the output-side steering motor is normal, compare a normal position sensing value of the output-side mechanism and a normal position sensing value of the output-side steering motor to thereby verify validity for the normal position sensing values, select either the normal position sensing value of the output-side mechanism or normal position sensing value of the output-side steering motor, verified for validity, as a primary position sensing value and the other as a redundant position sensing value, and control the output-side steering motor 231-2 based on the target position value of the output-side mechanism and the primary position sensing value.

If the normal primary position sensing value is changed to an abnormal value while controlling the output-side steering motor 231-2 based on the target position value of the output-side mechanism and the normal primary position sensing value, the output-side steering control module 222 may control the output-side steering motor 231-2 based on the target position value of the output-side mechanism and the redundant position sensing value.

In another embodiment, the output-side steering control module may check whether each of the position sensing value of the output-side mechanism and the position sensing value of the output-side steering motor is normal, select either a normal position sensing value of the output-side mechanism or a normal position sensing value of the output-side steering motor as a primary position sensing value and the other as a redundant position sensing value, compare the primary position sensing value and the redundant position sensing value to thereby verify validity for the primary position sensing value, and control the output-side steering motor 231-2 based on the target position value of the output-side mechanism and the validity-verified primary position sensing value.

If the validity-verified primary position sensing value is changed to an abnormal value while controlling the output-side steering motor 231-2 based on the target position value of the output-side mechanism and the validity-verified primary position sensing value, the output-side steering control module 222 may control the output-side steering motor 231-2 based on the target position value of the output-side mechanism and the redundant position sensing value.

The output-side steering control module 222 may control the output-side steering motor 231-2 by performing control to allow one normal position sensing value of the normal position sensing value of the output-side mechanism and the normal position sensing value of the output-side steering motor verified for validity, to follow the target position value of the output-side mechanism.

For example, the output-side steering control module 222 may calculate an error position value between the target position value of the output-side mechanism and one normal position sensing value of the normal position sensing value of the output-side mechanism and the normal position sensing value of the output-side steering motor verified for validity, generate an output-side steering motor reference torque value by controlling the error position value through a preset position control algorithm, and control the output-side steering motor 231-2 by controlling the output-side steering motor reference torque value through a preset motor control algorithm.

The above-described embodiments are described below in detail. Accordingly, the following detailed description may be applied to the above-described embodiments. For example, the foregoing description is applicable to the target position value of the sliding bar, the sensing value of the output-side linear position sensor, and the linear position sensing value of the sliding bar described below, with the above-described target position value of the output-side mechanism, the sensing value of the output-side mechanism position sensor, and the position sensing value of the output-side mechanism replaced therewith.

Referring to FIGS. 1 to 10, the output-side mechanism 120 according to an embodiment may include the sliding bar 122 connected with the wheels 150 and axially slidable inside the housing 121. The output-side mechanism 120 may further include the anti-rotation member 123 that is hollow, is circumferentially supported by the sliding bar 122, and is coupled to the inner circumferential surface of the housing 121. The output-side mechanism 120 may further include a magnet positioned on the sliding bar 122.

The steering assist device 200 according to an embodiment may further include an output-side linear position sensor 243-21 providing a linear position sensing value of the sliding bar and an output-side steering motor position sensor 243-1 providing a position sensing value of the output steering motor.

The output-side linear position sensor 243-21 may provide a linear position sensing value of the sliding bar that slides axially while being prevented from rotation by the anti-rotation member 123.

The output-side steering control module 222 may check whether each of the linear position sensing value of the sliding bar and the position sensing value of the output-side steering motor is normal, compare a normal linear position sensing value of the sliding bar and a normal position sensing value of the output-side steering motor to thereby verify validity for the normal position sensing values, and control the output-side steering motor 231-2 based on one normal position sensing value of the normal linear position sensing value of the sliding bar and the normal position sensing value of the output-side steering motor verified for validity, and a target position sensing value of the sliding bar received from the input-side steering control module 221.

Specifically, the output-side steering control module 222 may be connected with the input-side steering control module 221 and receive the target position value of the sliding bar from the input-side steering control module 221. The input-side steering control module 221 may generate a target position value of the sliding bar by using at least one of steering torque information, steering angle information, and vehicle speed information.

The output-side steering control module 222 may be connected with the output-side linear position sensor 243-21, and may receive a linear position sensing value of the sliding bar from the output-side linear position sensor 243-21. The output-side steering control module 222 may be connected with the output-side steering motor position sensor 243-1, and may receive a position sensing value of the output-side steering motor 231-2 from the output-side steering motor position sensor 243-1.

The output-side steering control module 222 may check whether each of the linear position sensing value of the sliding bar and the position sensing value of the output-side steering motor is normal.

For example, the output-side steering control module 222 may compare the linear position sensing value of the sliding bar and the position sensing value of the output-side steering motor with their respective preset normal ranges. If, as a result of the comparison, the linear position sensing value of the sliding bar and the position sensing value of the output-side steering motor fall within the preset normal ranges, the output-side steering control module 222 may determine that the linear position sensing value of the sliding bar and the position sensing value of the output-side steering motor are the normal linear position sensing value of the sliding bar and the normal position sensing value of the output-side steering motor. If, as a result of the comparison, the linear position sensing value of the sliding bar and the position sensing value of the output-side steering motor fall outside the preset normal ranges, the output-side steering control module 222 may determine that the linear position sensing value of the sliding bar and the position sensing value of the output-side steering motor are an abnormal linear position sensing value of the sliding bar and an abnormal position sensing value of the output-side steering motor.

The output-side steering control module 222 may verify the validity for the normal position sensing values by comparing the normal linear position sensing value of the sliding bar and the normal position sensing value of the output-side steering motor.

For example, the output-side steering control module 222 may identify a difference between the normal linear position sensing value of the sliding bar and the normal position sensing value of the output-side steering motor. If, as a result of the comparison, the difference between the normal linear position sensing value of the sliding bar and the normal position sensing value of the output-side steering motor falls within a preset validity range, the output-side steering control module 222 may determine that the normal linear position sensing value of the sliding bar and the normal position sensing value of the output-side steering motor have validity. If, as a result of the comparison, the difference between the normal linear position sensing value of the sliding bar and the normal position sensing value of the output-side steering motor falls outside a preset validity range, the output-side steering control module 222 may determine that the normal linear position sensing value of the sliding bar and the normal position sensing value of the output-side steering motor have no validity.

The output-side steering control module 222 may control the output-side steering motor 231-2 based on the target position value of the sliding bar received from the input-side steering control module 221 and one normal position sensing value of the normal linear position sensing value of the sliding bar and the normal position sensing value of the output-side steering motor verified for validity.

As an example, the output-side steering control module 222 may control the output-side steering motor 231-2 based on the target position value of the sliding bar and the validity-verified normal linear position sensing value of the sliding bar.

As another example, the output-side steering control module 222 may control the output-side steering motor 231-2 based on the target position value of the sliding bar and the validity-verified normal position sensing value of the output-side steering motor.

The output-side steering control module 222 may control the output-side steering motor 231-2 by performing control to allow one normal position sensing value of the normal linear position sensing value of the sliding bar and the normal position sensing value of the output-side steering motor verified for validity, to follow the target position value of the sliding bar.

In other words, the output-side steering control module 222 may calculate an error position value between the target position value of the sliding bar and one normal position sensing value of the normal linear position sensing value of the sliding bar and the normal position sensing value of the output-side steering motor verified for validity, generate an output-side steering motor reference torque value by controlling the error position value through a preset position control algorithm, and control the output-side steering motor 231-2 by controlling the output-side steering motor reference torque value through a preset motor control algorithm. The output-side steering control module 222 may control the output-side steering motor 231-2 by controlling, through the preset motor control algorithm, an error torque value between the output-side steering motor reference torque value and the measured steering motor assist torque value (e.g., a value obtained by multiplying the assist current value measured through a current sensor by a torque constant).

The output-side steering control module 222 may perform the position control algorithm (or a position controller) in a first control cycle and the motor control algorithm (or a motor controller) in a second control cycle. The second control cycle may be shorter than the first control cycle. In other words, the control cycle of the motor control algorithm may be shorter than the control cycle of the position control algorithm. For example, if the first control cycle is 1 ms, the second control cycle may be 100 µs. However, this is merely an example, and various modifications may be made thereto.

Although no duplicate description is given below for simplicity of description, what has been described above may also be applied below. For example, the above-described methods for checking normality, verifying validity, and controlling the output-side steering motor are likewise applicable below.

According to an embodiment, the output-side steering control module 222 may select either the linear position sensing value of the sliding bar or the position sensing value of the output-side steering motor as a primary position sensing value and the other as a redundant position sensing value, check whether each of the primary position sensing value and the redundant position sensing value is normal, compare a normal primary position sensing value and a normal redundant position sensing value to thereby verify validity for the normal primary position sensing value, and control the output-side steering motor 231-2 based on the validity-verified normal primary position sensing value and the target position value of the sliding bar.

If the validity-verified normal primary position sensing value is changed to an abnormal value while controlling the output-side steering motor 231-2 based on the target position value of the sliding bar and the validity-verified normal primary position sensing value, the output-side steering control module 222 may control the output-side steering motor 231-2 based on the target position value of the sliding bar and the normal redundant position sensing value.

In another embodiment, the output-side steering control module 222 may check whether each of the linear position sensing value of the sliding bar and the position sensing value of the output-side steering motor is normal, compare a normal linear position sensing value of the sliding bar and a normal position sensing value of the output-side steering motor to thereby verify validity for the normal position sensing values, select either the normal linear position sensing value of the sliding bar or normal position sensing value of the output-side steering motor, verified for validity, as a primary position sensing value and the other as a redundant position sensing value, and control the output-side steering motor 231-2 based on the target position value of the sliding bar and the primary position sensing value.

If the normal primary position sensing value is changed to an abnormal value while controlling the output-side steering motor 231-2 based on the target position value of the sliding bar and the normal primary position sensing value, the output-side steering control module 222 may control the output-side steering motor 231-2 based on the target position value of the sliding bar and the redundant position sensing value.

In another embodiment, the output-side steering control module may check whether each of the linear position sensing value of the sliding bar and the position sensing value of the output-side steering motor is normal, select either a normal linear position sensing value of the sliding bar or a normal position sensing value of the output-side steering motor as a primary position sensing value and the other as a redundant position sensing value, compare the primary position sensing value and the redundant position sensing value to thereby verify validity for the primary position sensing value, and control the output-side steering motor 231-2 based on the target position value of the sliding bar and the validity-verified primary position sensing value.

If the validity-verified primary position sensing value is changed to an abnormal value while controlling the output-side steering motor 231-2 based on the target position value of the sliding bar and the validity-verified primary position sensing value, the output-side steering control module 222 may control the output-side steering motor 231-2 based on the target position value of the sliding bar and the redundant position sensing value.

Figure 11:
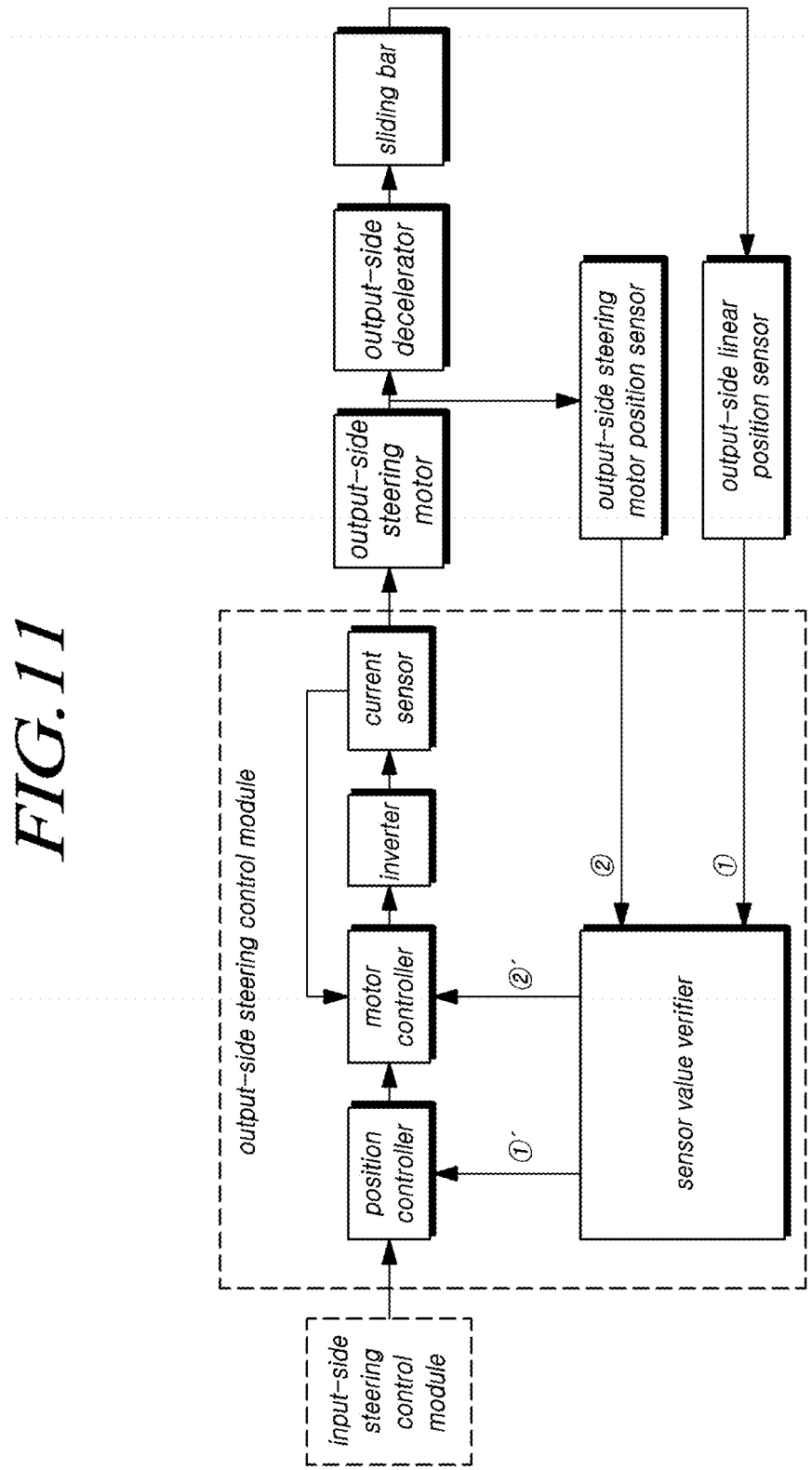
FIGS. 11 and 12 are views illustrating a steering assist method according to an embodiment.
Figure 12:
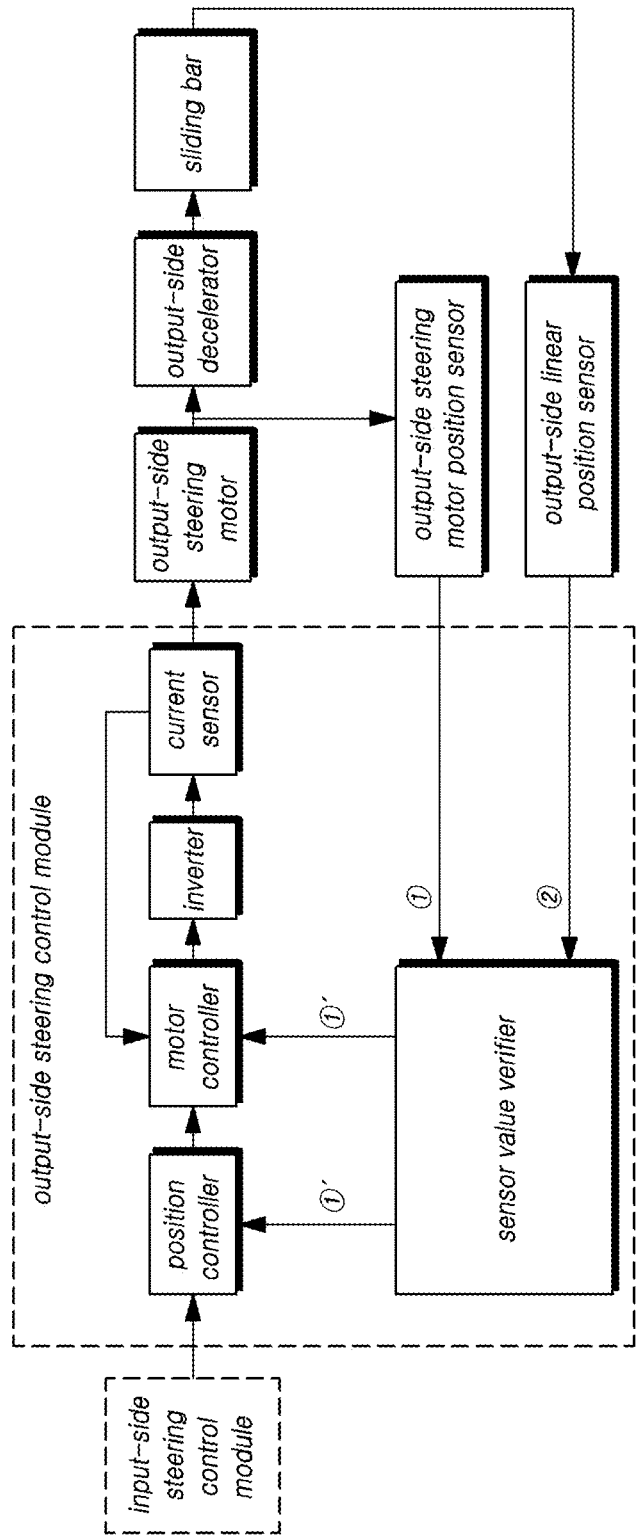

FIGS. 11 and 12 are views illustrating a steering assist method according to an embodiment.

In FIGS. 11 and 12, ① may denote 'primary,' and ② may denote 'redundant' or 'sub.'

Referring to FIG. 11, the output-side linear position sensor may be a primary position sensor, and the output-side steering motor position sensor may be a redundant position sensor.

The input-side steering control module may calculate a target position value of the sliding bar of the output-side mechanism based on vehicle state information (e.g., steering torque information, steering angle information, and/or vehicle information) and/or around-vehicle information. The sliding bar of the output-side mechanism may be a mechanism (or member) that functions as a rack free from a pinion.

The output-side steering motor position sensor may measure the angle of the output-side steering motor to obtain a position sensing value ② of the output-side steering motor. The output-side linear position sensor may measure the magnet positioned on the sliding bar to obtain a linear position sensing value ① of the sliding bar.

A sensor value verifier may receive the position sensing value ② of the output-side steering motor from the output-side steering motor position sensor and the linear position sensing value ① of the sliding bar from the output-side linear position sensor. The sensor value verifier may verify sensor values using the above-mentioned normality check and validity check.

For example, the sensor value verifier may select the linear position sensing value ① of the sliding bar as a primary position sensing value and the position sensing value ② of the output-side steering motor as a redundant position sensing value. The sensor value verifier may check whether each of the linear position sensing value ① of the sliding bar and the position sensing value ② of the output-side steering motor is normal. If the linear position sensing value ① of the sliding bar and the position sensing value ② of the output-side steering motor are in a normal state, the sensor value verifier may compare the normal linear position sensing value of the sliding bar with the normal position sensing value of the steering motor to thereby verify validity for the linear position sensing value of the sliding bar. Since the position sensing value of the steering motor may be the angle of the steering motor, a value reflecting the deceleration rate of the decelerator to the position sensing value of the steering motor may be used.

The position controller may receive a target position value of the sliding bar from the input-side steering control module and may receive the validity-verified linear position sensing value (①') of the sliding bar from the sensor value verifier.

The position controller may control to allow the validity-verified linear position sensing value (①') of the sliding bar to follow the target position value of the sliding bar through the position control algorithm and, based thereupon, may calculate an output-side steering motor reference torque value (or, current value).

The position control algorithm may include at least one of P (proportional) control, I (integral) control, and D (differential) control but, without limitations thereto, any algorithm capable of controlling the position may be used.

The motor controller may receive the output-side steering motor reference torque value (or current value) from the position controller, the output current value of the inverter from the current sensor, and the validity-verified position sensing value (②') of the steering motor from the sensor value verifier.

The motor controller may control to allow the output current value of the inverter to follow the output-side steering motor reference torque value (or current value) through the motor control algorithm and, based thereupon, may control the inverter. In particular, the motor controller may control to allow the output current value of the inverter to follow the output-side steering motor reference torque value (or current value) based on the validity-verified position sensing value (②') of the steering motor.

The torque value may be a value in which a torque constant is reflected in the current value.

The motor control algorithm may include at least one of a current control algorithm, a vector control algorithm, and a pulse width modulation (PWM) algorithm but, without limitations thereto, and any algorithm capable of controlling a motor may be included. In particular, the current control algorithm may include at least one of P (proportional) control, I (integral) control, and D (differential) control but, without limitations thereto, any algorithm capable of controlling current may be used.

The inverter may drive the output-side steering motor. The output-side steering motor may actuate a decelerator mechanically coupled.

The rotational force of the output-side decelerator may be transferred to axially slide the sliding bar. As the sliding bar coupled with the tie rod and the knuckle arm axially slide inside the housing, the wheels may be steered.

As described above, according to an embodiment, the steering assist device and method and the steering system may directly measure the position of the sliding bar (or pinion-free rack), which is a control target, through a high-precision, high-resolution output-side linear position sensor and control the steering based on the position sensing value of the sliding bar, thereby reducing influence by a mechanical gap and hence enhancing the accuracy of steering control. Further, it is possible to enhance the redundancy functionality and reliability of the system by using the position sensing value of the output-side steering motor as a redundant signal or to determine validity.

Referring to FIG. 12, the output-side linear position sensor may be a redundant position sensor, and the output-side steering motor position sensor may be a primary position sensor.

As compared with FIG. 11, FIG. 12 differs only in the operation of the sensor value verifier. Thus, no duplicate description of those described above in connection with FIG. 11 is given below, with only the sensor value verifier described.

The sensor value verifier may select the linear position sensing value ② of the sliding bar as a redundant position sensing value and the position sensing value ① of the steering motor as a redundant position sensing value. The sensor value verifier may check whether each of the linear position sensing value ② of the sliding bar and the position sensing value ① of the steering motor is normal. If the linear position sensing value of the sliding bar and the position sensing value of the output-side steering motor are in a normal state, the sensor value verifier may compare the normal linear position sensing value of the sliding bar with the normal position sensing value of the steering motor to thereby verify validity for the position sensing value of the steering motor. Since the position sensing value of the steering motor may be the angle of the steering motor, a value reflecting the deceleration rate of the decelerator to the position sensing value of the steering motor may be used.

The position controller may receive a target position value of the sliding bar from the input-side steering control module and may receive the validity-verified linear position sensing value (①') of the steering motor from the sensor value verifier.

The position controller may control to allow the validity-verified linear position sensing value (①') of the steering motor to follow the target position value of the sliding bar through the position control algorithm and, based thereupon, may calculate an output-side steering motor reference torque value (or, current value).

As described above, according to an embodiment, the steering assist device and method and the steering system may estimate the position of the sliding bar (or pinion-free rack) and, based thereupon, control steering, allowing for high-performance control with an excellent resolution and sampling rate. It is also possible to enhance the redundancy functionality and reliability of the system using the position sensing value of the sliding bar as a redundant signal or to determine validity.

The sensor value verifier, the position controller, and the motor controller may be included in the controller unit 50 (e.g., the controller unit of the output-side steering control module) but, without limitations thereto, may be provided separately.

A steering assist method according to an embodiment is described below with reference to the accompanying drawings. According to an embodiment, the steering assist method may be performed through the steering device, the steering assist device, and the steering system. For simplicity of description, no duplicate description is given below of the steering device, steering assist device, and steering system described above in connection with FIGS. 1 to 12.

Figure 13:
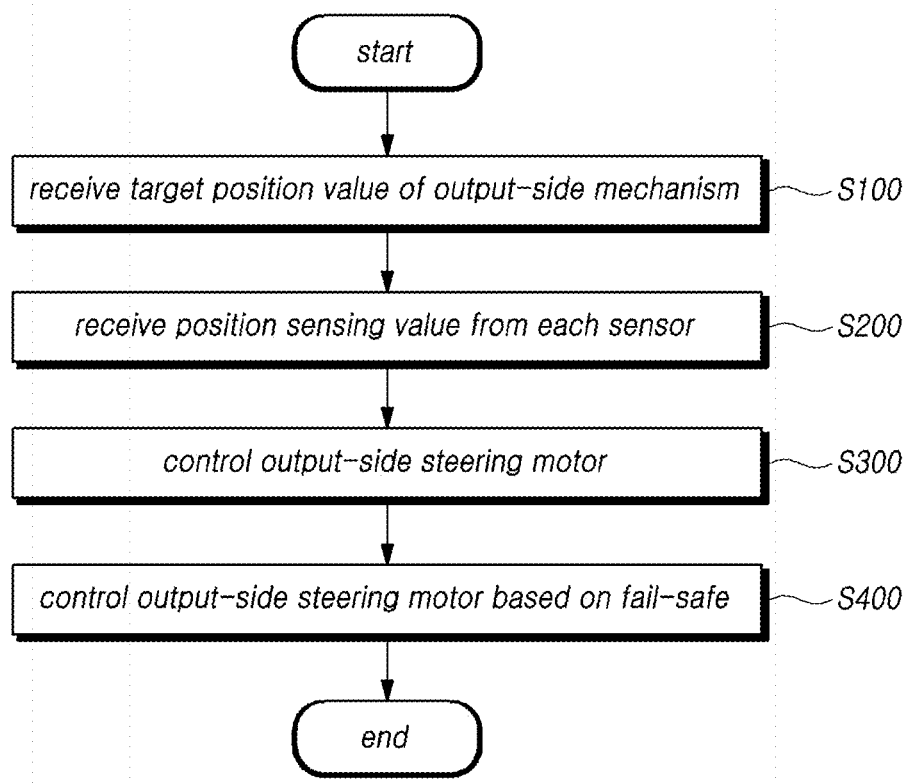
FIG. 13 is a flowchart illustrating a steering assist method according to an embodiment.

FIG. 13 is a flowchart illustrating a steering assist method according to an embodiment.

Referring to FIG. 13, according to an embodiment, a steering assist method may include the step S100 of receiving a target position value of an output-side mechanism, the step S200 of position sensing values from respective sensors, the step S300 of controlling an output-side steering motor, and the step S400 of controlling the output-side steering motor based on fail-safe.

For example, according to an embodiment, a steering assist method may be performed by an output-side steering control module controlling an output-side steering actuator including an output-side steering motor to assist an output-side mechanism mechanically separated from an input-side mechanism connected with a steering wheel and connected with a wheel.

First, a target position value of the output-side mechanism may be received (S100).

Thereafter, a position sensing value of the output-side mechanism and a position sensing value of the output-side steering motor included in the output-side steering actuator may be received from the respective sensors (S200).

For example, in step S200, a linear position sensing value of a sliding bar connected with a wheel and provided to be axially slidable inside a housing may be received from an output-side linear position sensor.

In step S200, the linear position sensing value of the sliding bar provided to be axially slidable while being prevented from rotation by an anti-rotation member may be received from the output-side linear position sensor.

In step S200, the position sensing value of the output-side steering motor may also be received from the output-side steering motor position sensor.

Then, it may be possible to check whether each of the position sensing value of the output-side mechanism and the position sensing value of the output-side steering motor is normal, compare a normal position sensing value of the output-side mechanism with a normal position sensing value of the output-side steering motor to thereby verify validity for the normal position sensing values, and control the output-side steering motor based on the target position value of the output-side mechanism and one normal position sensing value of the normal position sensing value of the output-side mechanism and the normal position sensing value of the output-side steering motor verified for validity (S300).

For example, in step S300, it may be possible to check whether each of the linear position sensing value of the sliding bar and the position sensing value of the output-side steering motor is normal, compare a normal linear position sensing value of the sliding bar with a normal position sensing value of the output-side steering motor to thereby verify the validity for the normal position sensing values, and control the output-side steering motor based on a target position value of the sliding bar and one normal position sensing value of the normal linear position sensing value of the sliding bar and the normal position sensing value of the output-side steering motor verified for validity.

According to an embodiment, in step S300, it may be possible to select either the linear position sensing value of the sliding bar or the position sensing value of the output-side steering motor as a primary position sensing value and the other as a redundant position sensing value, check whether each of the primary position sensing value and the redundant position sensing value is normal, compare a normal primary position sensing value and a normal redundant position sensing value to thereby verify validity for the normal primary position sensing value, and control the output-side steering motor based on the validity-verified normal primary position sensing value and the target position value of the sliding bar.

Next, in step S400, it may be possible to control the output-side steering motor based on the target position value of the sliding bar and the normal redundant position sensing value if the validity-verified normal primary position sensing value is changed to an abnormal value while controlling the output-side steering motor based on the target position value of the sliding bar and the validity-verified normal primary position sensing value.

In another embodiment, in step S300, it may be possible to check whether each of the linear position sensing value of the sliding bar and the position sensing value of the output-side steering motor is normal, compare a normal linear position sensing value of the sliding bar and a normal position sensing value of the output-side steering motor to thereby verify validity for the normal position sensing values, select either the normal linear position sensing value of the sliding bar or normal position sensing value of the output-side steering motor, verified for validity, as a primary position sensing value and the other as a redundant position sensing value, and control the output-side steering motor based on the target position value of the sliding bar and the primary position sensing value.

Then, in step S400, it may be possible to control the output-side steering motor based on the target position value of the sliding bar and the redundant position sensing value if the primary position sensing value is changed to an abnormal value while controlling the output-side steering motor based on the target position value and the primary position sensing value.

In another embodiment, in step S300, it may be possible to check whether each of the linear position sensing value of the sliding bar and the position sensing value of the output-side steering motor is normal, select either a normal linear position sensing value of the sliding bar or a normal position sensing value of the output-side steering motor as a primary position sensing value and the other as a redundant position sensing value, compare the primary position sensing value and the redundant position sensing value to thereby verify validity for the primary position sensing value, and control the output-side steering motor based on the target position value of the sliding bar and the validity-verified primary position sensing value.

Next, in step S400, it may be possible to control the output-side steering motor based on the target position value of the sliding bar and the redundant position sensing value if the validity-verified normal primary position sensing value is changed to an abnormal value while controlling the output-side steering motor based on the target position value of the sliding bar and the validity-verified primary position sensing value.

Figure 14:
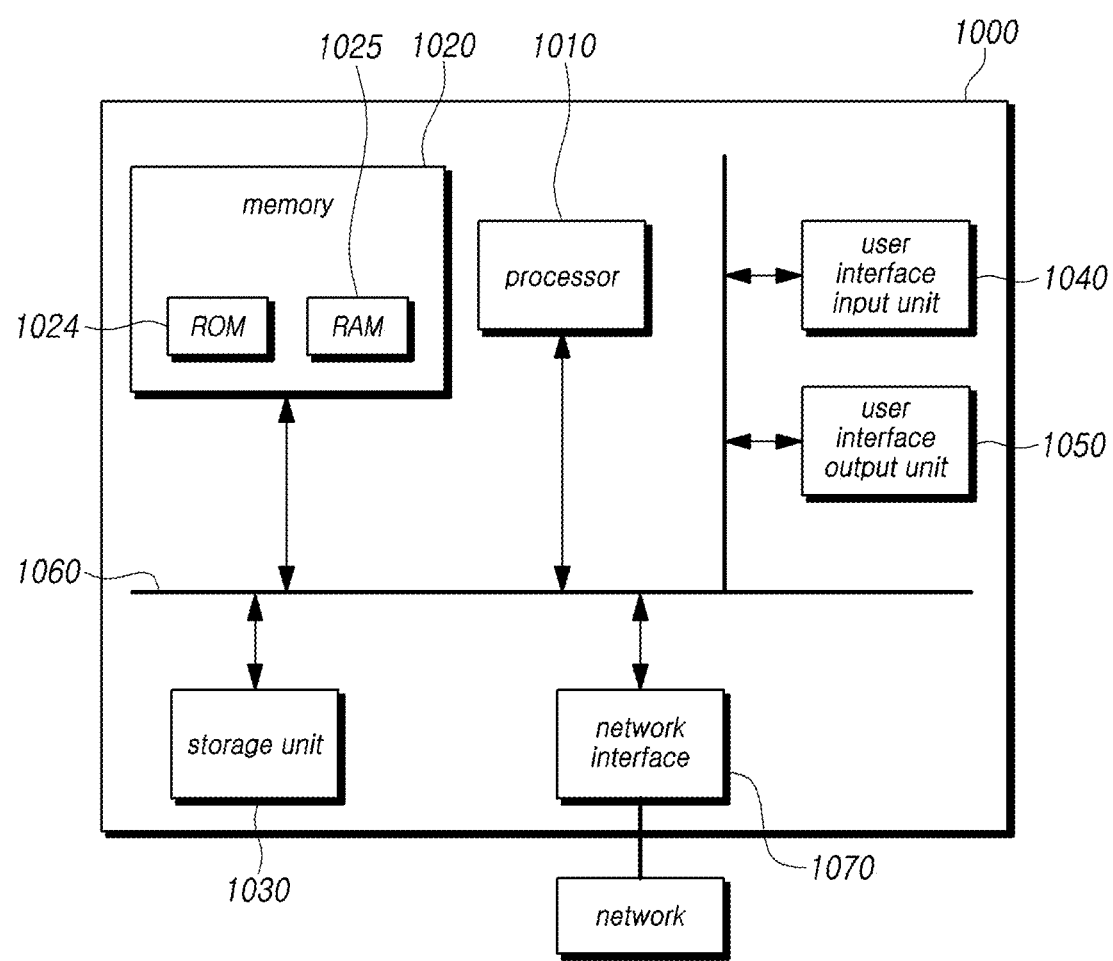
FIG. 14 is a block diagram illustrating a configuration of a computer system for a steering control device, a steering assist device, and a steering system according to an embodiment.

FIG. 14 is a block diagram illustrating a configuration of a computer system for a steering control device, a steering assist device, and a steering system according to an embodiment.

Referring to FIG. 14, the above-described embodiments may be implemented as, e.g., a computer-readable recording medium, in a computer system. As illustrated in the drawings, the computer system 1000 of the steering control device, steering assist device, and steering system may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as anon-volatile computer recording medium storing computer-implemented methods or computer executable instructions. The instructions may be executed by the processor to perform a method according to an embodiment of the disclosure. In particular, if the at least one core includes a plurality of cores, at least one of the plurality of cores may include a lockstep core.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering assist device, comprising:
an input-side steering control module controlling an input-side steering actuator to assist an input-side mechanism connected with a steering wheel;
an output-side steering control module controlling an output-side steering actuator to assist an output-side mechanism mechanically separated from the input-side mechanism and connected with a wheel;
an output-side linear position sensor providing a linear position sensing value of a sliding bar provided to be axially slidable inside a housing and connected with a wheel; and
an output-side steering motor position sensor providing the position sensing value of the output-side steering motor,
wherein the output-side steering control module checks whether each of the linear position sensing value of the sliding bar and the position sensing value of the output-side steering motor is normal, compares a normal linear position sensing value of the sliding bar with the normal position sensing value of the output-side steering motor to thereby verify the validity for the normal position sensing values, and controls the output-side steering motor based on a target position value of the sliding bar received from the input-side steering control module and one normal position sensing value of the normal linear position sensing value of the sliding bar and the normal position sensing value of the output-side steering motor verified for validity.

2. The steering assist device of claim 1, wherein the output-side steering control module selects either the linear position sensing value of the sliding bar or the position sensing value of the output-side steering motor as a primary position sensing value and the other as a redundant position sensing value, checks whether each of the primary position sensing value and the redundant position sensing value is normal, compares a normal primary position sensing value with a normal redundant position sensing value to thereby verify validity for the normal primary position sensing value, and controls the output-side steering motor based on the target position value of the sliding bar and the validity-verified normal primary position sensing value.

3. The steering assist device of claim 2, wherein the output-side steering control module controls the output-side steering motor based on the target position value of the sliding bar and the normal redundant position sensing value if the validity-verified normal primary position sensing value is changed to an abnormal value while controlling the output-side steering motor based on the target position value of the sliding bar and the validity-verified normal primary position sensing value.

4. The steering assist device of claim 1, wherein the output-side steering control module checks whether each of the linear position sensing value of the sliding bar and the position sensing value of the output-side steering motor is normal, compares the normal linear position sensing value of the sliding bar with the normal position sensing value of the output-side steering motor to thereby verify the validity for the normal position sensing values, selects either the validity-verified normal linear position sensing value of the sliding bar or normal position sensing value of the output-side steering motor as a primary position sensing value and the other as a redundant position sensing value, and controls the output-side steering motor based on the target position value of the sliding bar and the primary position sensing value.

5. The steering assist device of claim 4, wherein the output-side steering control module controls the output-side steering motor based on the target position value of the sliding bar and the redundant position sensing value if the primary position sensing value is changed to an abnormal value while controlling the output-side steering motor based on the target position value of the sliding bar and the primary position sensing value.

6. The steering assist device of claim 1, wherein the output-side steering control module checks whether each of the linear position sensing value of the sliding bar and the position sensing value of the output-side steering motor is normal, selects either the normal linear position sensing value of the sliding bar or the normal position sensing value of the output-side steering motor as a primary position sensing value and the other as a redundant position sensing value, compares the primary position sensing value with the redundant position sensing value to thereby verify validity for the primary position sensing value, and controls the output-side steering motor based on the target position value of the sliding bar and the validity-verified primary position sensing value.

7. The steering assist device of claim 6, wherein the output-side steering control module controls the output-side steering motor based on the target position value of the sliding bar and the redundant position sensing value if the validity-verified primary position sensing value is changed to an abnormal value while controlling the output-side steering motor based on the target position value of the sliding bar and the validity-verified primary position sensing value.

8. The steering assist device of claim 6, wherein the output-side liner position sensor provides the linear position sensing value of the sliding bar provided to be axially slidable while being prevented from rotation by an anti-rotation member.

9. A steering system, comprising:
a steering device including an input-side mechanism connected with a steering wheel and an output-side mechanism mechanically separated from the input-side mechanism and connected with a wheel; and
a steering assist device including an input-side steering control module controlling an input-side steering actuator to assist the input-side mechanism and an output-side steering control module controlling an output-side steering actuator to assist the output-side mechanism,
wherein the output-side mechanism includes a sliding bar connected with the wheel and provided to be axially slidable inside a housing,
wherein the steering assist device further includes an output-side linear position sensor providing a linear position sensing value of the sliding bar and an output-side steering motor position sensor providing a position sensing value of the output-side steering motor, and
wherein the output-side steering control module checks whether each of the linear position sensing value of the sliding bar and the position sensing value of the output-side steering motor is normal, compares a normal linear position sensing value of the sliding bar with the normal position sensing value of the output-side steering motor to thereby verify the validity for the normal position sensing values, and controls the output-side steering motor based on a target position value of the sliding bar received from the input-side steering control module and one normal position sensing value of the normal linear position sensing value of the sliding bar and the normal position sensing value of the output-side steering motor verified for validity.

10. The steering system of claim 9, wherein the output-side steering control module selects either the linear position sensing value of the sliding bar or the position sensing value of the output-side steering motor as a primary position sensing value and the other as a redundant position sensing value, checks whether each of the primary position sensing value and the redundant position sensing value is normal, compares a normal primary position sensing value with a normal redundant position sensing value to thereby verify validity for the normal primary position sensing value, and controls the output-side steering motor based on the target position value of the sliding bar and the validity-verified normal primary position sensing value.

11. The steering system of claim 9, wherein the output-side steering control module checks whether each of the linear position sensing value of the sliding bar and the position sensing value of the output-side steering motor is normal, compares the normal linear position sensing value of the sliding bar with the normal position sensing value of the output-side steering motor to thereby verify the validity for the normal position sensing values, selects either the validity-verified normal linear position sensing value of the sliding bar or normal position sensing value of the output-side steering motor as a primary position sensing value and the other as a redundant position sensing value, and controls the output-side steering motor based on the target position value of the sliding bar and the primary position sensing value.

12. The steering system of claim 9, wherein the output-side steering control module checks whether each of the linear position sensing value of the sliding bar and the position sensing value of the output-side steering motor is normal, selects either the normal linear position sensing value of the sliding bar or the normal position sensing value of the output-side steering motor as a primary position sensing value and the other as a redundant position sensing value, compares the primary position sensing value with the redundant position sensing value to thereby verify validity for the primary position sensing value, and controls the output-side steering motor based on the target position value of the sliding bar and the validity-verified primary position sensing value.

13. The steering system of claim 9, wherein the output-side mechanism further includes a hollow anti-rotation member circumferentially supported by the sliding bar and coupled to an inner circumferential surface of the housing, and
wherein the output-side linear position sensor provides the linear position sensing value of the sliding bar axially slid while being prevented from rotation by the anti-rotation member.

14. A steering assist method performed by an output-side steering control module controlling an output-side steering actuator including an output-side steering motor to assist an output-side mechanism mechanically separated from an input-side mechanism connected with a steering wheel and connected with a wheel, the steering assist method comprising:
receiving a target position value of the output-side mechanism;
receiving a position sensing value of the output-side mechanism and a position sensing value of the output-side steering motor included in the output-side steering actuator from respective sensors; and checking whether each of the position sensing value of the output-side mechanism and the position sensing value of the output-side steering motor is normal, comparing a normal position sensing value of the output-side mechanism with a normal position sensing value of the output-side steering motor to thereby verify validity for the normal position sensing values, and controlling the output-side steering motor based on the target position value of the output-side mechanism and one normal position sensing value of the normal position sensing value of the output-side mechanism and the normal position sensing value of the output-side steering motor verified for validity, wherein receiving the position sensing value of the output-side mechanism and the position sensing value of the output-side steering motor from the respective sensors includes:

receiving, from an output-side linear position sensor, a linear position sensing value of a sliding bar connected with a wheel and provided to be axially slidable inside a housing; and receiving, from an output-side steering motor position sensor, the position sensing value of the output-side steering motor, and wherein controlling the output-side steering motor includes checking whether each of the linear position sensing value of the sliding bar and the position sensing value of the output-side steering motor is normal, comparing a normal linear position sensing value of the sliding bar with a normal position sensing value of the output-side steering motor to thereby verify the validity for the normal position sensing values, and controlling the output-side steering motor based on a target position value of the sliding bar and one normal position sensing value of the normal linear position sensing value of the sliding bar and the normal position sensing value of the output-side steering motor verified for validity.

15. The steering assist method of claim 14, wherein controlling the output-side steering motor includes selecting either the linear position sensing value of the sliding bar or the position sensing value of the output-side steering motor as a primary position sensing value and the other as a redundant position sensing value, checking whether each of the primary position sensing value and the redundant position sensing value is normal, comparing a normal primary position sensing value with a normal redundant position sensing value to thereby verify validity for the normal primary position sensing value, and controlling the output-side steering motor based on the target position value of the sliding bar and the validity-verified normal primary position sensing value.

16. The steering assist method of claim 14, wherein controlling the output-side steering motor includes checking whether each of the linear position sensing value of the sliding bar and the position sensing value of the output-side steering motor is normal, comparing the normal linear position sensing value of the sliding bar with the normal position sensing value of the output-side steering motor to thereby verify the validity for the normal position sensing values, selecting either the validity-verified normal linear position sensing value of the sliding bar or normal position sensing value of the output-side steering motor as a primary position sensing value and the other as a redundant position sensing value, and controlling the output-side steering motor based on the target position value of the sliding bar and the primary position sensing value.

17. The steering assist method of claim 14, wherein controlling the output-side steering motor includes checking whether each of the linear position sensing value of the sliding bar and the position sensing value of the output-side steering motor is normal, selecting either the normal linear position sensing value of the sliding bar or the normal position sensing value of the output-side steering motor as a primary position sensing value and the other as a redundant position sensing value, comparing the primary position sensing value with the redundant position sensing value to thereby verify validity for the primary position sensing value, and controlling the output-side steering motor based on the target position value of the sliding bar and the validity-verified primary position sensing value.

* * * * *